United States Patent [19]
Gurganus et al.

[11] Patent Number: 5,671,967
[45] Date of Patent: Sep. 30, 1997

[54] COEXTRUDED VEHICLE SILL COVER ARTICLE

[75] Inventors: Cecil R. Gurganus, Evansville; Roy C. Sanford, Dale; Jerry W. Atkinson, Vincennes; Scott E. Baker, Newburgh; Michael C. Sander, Evansville; John J. Vincini, Newburgh, all of Ind.

[73] Assignee: GenCorp Inc., Fairlawn, Ohio

[21] Appl. No.: 431,205

[22] Filed: Apr. 28, 1995

[51] Int. Cl.⁶ .................................................. B60R 13/06
[52] U.S. Cl. ......................... 296/146.9; 49/469; 296/209; 427/387; 427/393.4
[58] Field of Search .................... 296/146.9, 209; 49/467, 469; 244/134 G, 134 E, 134 F; 427/387, 393.4, 393.5, 372.2

[56] References Cited

U.S. PATENT DOCUMENTS

| | | | |
|---|---|---|---|
| 2,313,812 | 3/1943 | Duffy | 296/209 X |
| 4,364,970 | 12/1982 | Imada et al. | 427/40 |
| 4,565,714 | 1/1986 | Koshar | 427/54.1 |
| 4,676,995 | 6/1987 | Fabris et al. | 427/54.1 |
| 5,101,655 | 4/1992 | Mueller | 73/7 |
| 5,112,101 | 5/1992 | Katcherian et al. | 296/201 |
| 5,190,799 | 3/1993 | Ellingson, III | 428/53 |
| 5,314,752 | 5/1994 | Bova et al. | 428/424.2 |
| 5,356,194 | 10/1994 | Takeuchi | 296/146.9 |
| 5,429,404 | 7/1995 | King, Sr. | 296/146.9 X |

*Primary Examiner*—David M. Mitchell
*Assistant Examiner*—Kia M. Robinson
*Attorney, Agent, or Firm*—Robert F. Rywalski; Gerald H. Glanzman; David H. Badger

[57] ABSTRACT

A sill cover article for automobiles and other vehicles which has a first, relatively rigid sill cover portion and a second, relatively flexible lower door sealing portion that is manufactured as a single component and can be attached to a vehicle in a single mounting operation. The sill cover article is preferably manufactured of two materials of different durometer which are coextruded to form a single component. The sill cover article or a portion thereof may be provided with various coatings and/or additives to provide the article with desired properties. For example, the lower door sealing portion may be provided with an ice-release agent to prevent ice from forming on a surface thereof. The sill cover article of the present invention provides a reduction in assembly time, inventory requirements and overall manufacturing costs of a vehicle.

16 Claims, 2 Drawing Sheets

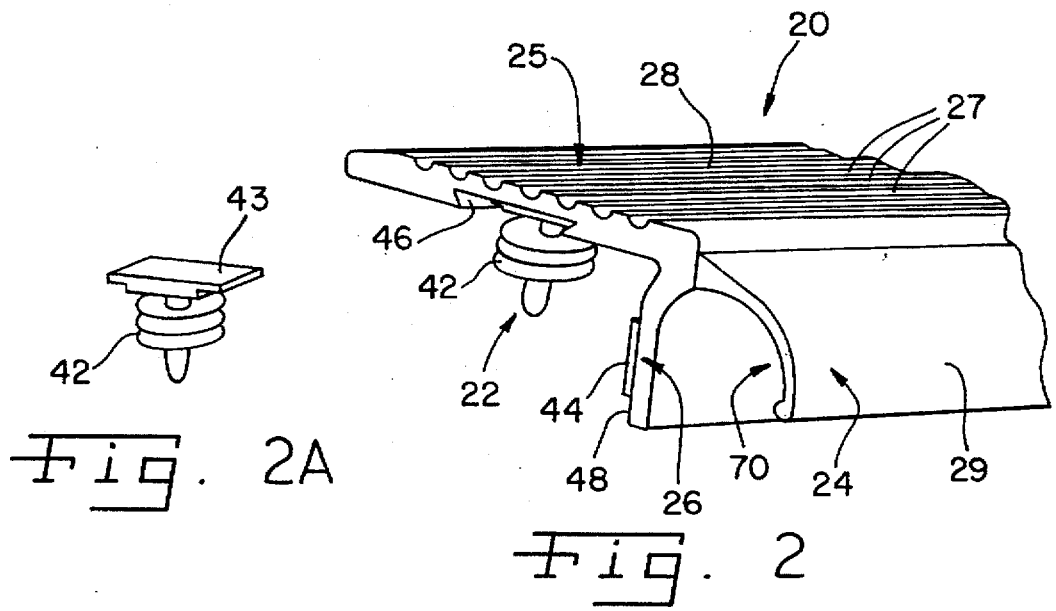
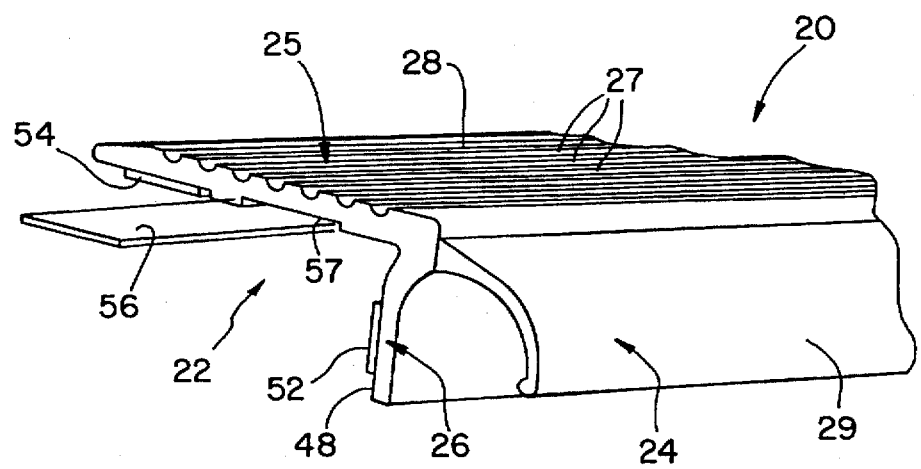
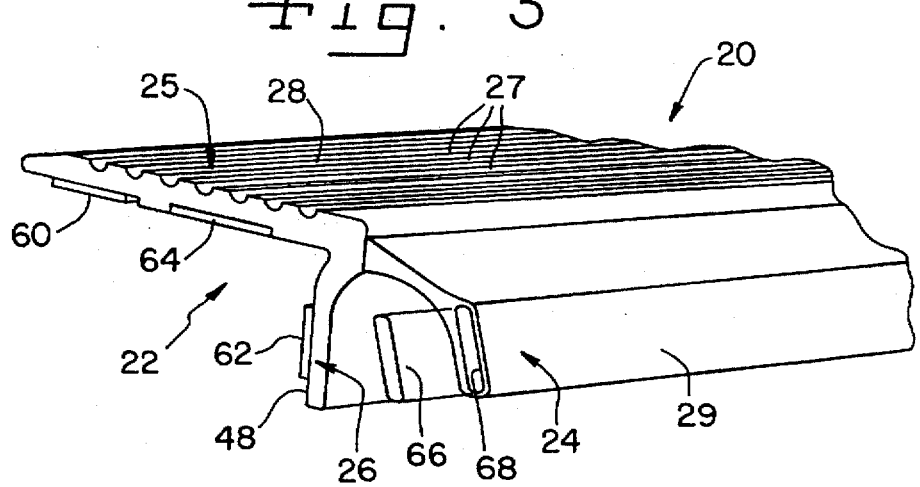

COEXTRUDED VEHICLE SILL COVER ARTICLE

BACKGROUND OF THE INVENTION

1. Field of the Invention

The present invention relates generally to a sill cover article for automobiles and other vehicles; and, more particularly, to a sill cover article that includes a relatively rigid sill cover portion and a relatively flexible lower door sealing portion that is manufactured as a single component and that can be attached in a single mounting operation.

2. Description of the Prior Art

Automobiles and other vehicles are typically provided with multiple sill covers which extend along the vehicle lower body. Conventionally, such sill covers comprise substantially rigid or semi-rigid members which are fastened to the metal body of the vehicle with screws, push pins or other attachment structure; and which function as step pads and to provide anti-slip surfaces onto which a person can step when entering into or exiting from the vehicle.

In order to prevent dust, moisture, wind, road noise, etc. from coming up into the sill area, vehicles are usually also provided with lower door seals. These are typically attached to the lower portions of the vehicle doors, and comprise relatively flexible members which are configured to seal between the lower portions of the doors and the body of the vehicle when the doors are closed.

In current automobiles and other vehicles, the sill covers and the lower door seals are separate components which are individually manufactured and separately installed in the vehicle, each utilizing its own attachment structure. This increases assembly time and inventory requirements; and, in general, the overall cost of manufacturing the vehicle.

SUMMARY OF THE INVENTION

The present invention provides a sill cover article for automobiles and other vehicles that includes a sill cover portion and a lower door sealing portion that is manufactured as a single component and that can be attached to a vehicle in a single mounting operation to provide both a sill cover function and a lower door sealing function.

A sill cover article according to the present invention comprises a first, relatively rigid sill cover portion and a second, relatively flexible lower door sealing portion. Preferably, the first and second portions comprise two polymer materials, for example, two different vinyl compositions or other thermoplastic or thermoset compositions, of different durometer that are coextruded simultaneously with two or more different extruders to provide a single sill cover article having portions with different desired properties and functions. The sill cover portion is relatively rigid (e.g., 55 Shore D) and provides a substantially flat upper surface onto which a person can step when entering into or exiting from the vehicle, and may include a plurality of grooves running lengthwise therealong to provide the surface with anti-slip properties. The lower door sealing portion is relatively flexible (e.g., 65 Shore A) and extends downwardly and outwardly from the sill cover portion to provide an effective seal between the lower portion of a vehicle door and the body of the vehicle when the door is closed to prevent dust, moisture, wind, road noise and the like from coming up into the sill area of the vehicle.

The sill cover article according to the present invention replaces the separate sill cover and lower door seal currently in use in vehicles with a single component which is attached to the vehicle in a single mounting operation, thus resulting in a reduced installation time and an overall reduction in inventory requirements.

The sill cover article according to the present invention can be conveniently attached to the metal body of the vehicle utilizing adhesive tape, push pins, magnet strips or a combination thereof, or other suitable attachment structure.

According to an important aspect of the present invention, the sill cover article or a portion thereof may be provided with various additives or coatings as desired or required for particular applications. For example, the sill cover article or a portion thereof can be coated, for example, with an additional extruder, or otherwise provided with a coloring agent which may be black or any desired color to coordinate with interior/exterior colors of the vehicle. Also, the sill cover article or a portion thereof may be coated or provided with one or more additives to provide the article with desired properties.

In accordance with presently preferred embodiments of the invention, for example, the lower door sealing portion of the sill cover article is advantageously provided with an ice-release coating to prevent ice from forming thereon. In this regard, the lower door sealing portion typically comprises a curved, downwardly extending portion which is positioned to be deformed by a vehicle door during closing of the door. The deformed sealing portion produces a trough-like configuration that extends along the length of the sill cover article and which has a tendency to trap water and moisture from rain, drainage, run-off etc. Under environmental conditions below the freezing point of water, ice can form in the trough and produce a sticking behavior that can interfere with subsequent sealing, particularly after repeated door openings and closings.

According to one presently preferred embodiment of the invention, a migratory additive such as a fatty acid amide or a fatty acid monoamide is incorporated into the composition of the lower door sealing portion of the sill cover article that will migrate to the surface of the portion shortly after extrusion to produce a surface layer that does not have sticking and adhesion properties for ice, and thereby does not interfere with subsequent door openings and closings that would compromise the sealing properties of the portion.

Alternatively, a thin layer of a non-sticking coating material may be applied directly to the surface of the lower door sealing portion after the extrusion process.

According to a further embodiment of the invention, a minor quantity of an ultraviolet (UV) absorber additive may also be included in the composition of the lower door sealing portion. The UV absorber emits under exposure to black or UV light according to the concentration, either of the applied ice-release coating or of the migratory additive on the surface of the lower door sealing portion. The presence of the UV absorber additive thus indicates whether the non-stick coating or the migratory additive is present in sufficient concentration.

In general, the sill cover article according to the present invention is of lower cost than the separate sill cover and lower door seal currently employed in vehicles, and can be installed in a reduced time with less overall attachment structure, and thus provides for a reduction in the overall cost of manufacturing a vehicle. The sill cover article can also be conveniently manufactured from recycled materials such as reclaimed PVC to provide an even further reduction in costs. In addition, the sill cover article of the present invention can be provided in a wide variety of colors, surface styles and profile shapes to accommodate the similar variables present in vehicle body styles at the sill-door area.

Yet further advantages and specific details of the invention will become apparent hereinafter in conjunction with the following detailed description of presently preferred embodiments.

BRIEF DESCRIPTION OF THE DRAWINGS

FIG. 2 illustrates a sill cover article according to a presently preferred embodiment of the invention and FIG. 2A illustrates a detail of FIG. 2; and FIGS. 3 and 4 illustrate sill cover articles according to alternative embodiments of the present invention.

DETAILED DESCRIPTION OF THE PREFERRED EMBODIMENTS

Figure 1:
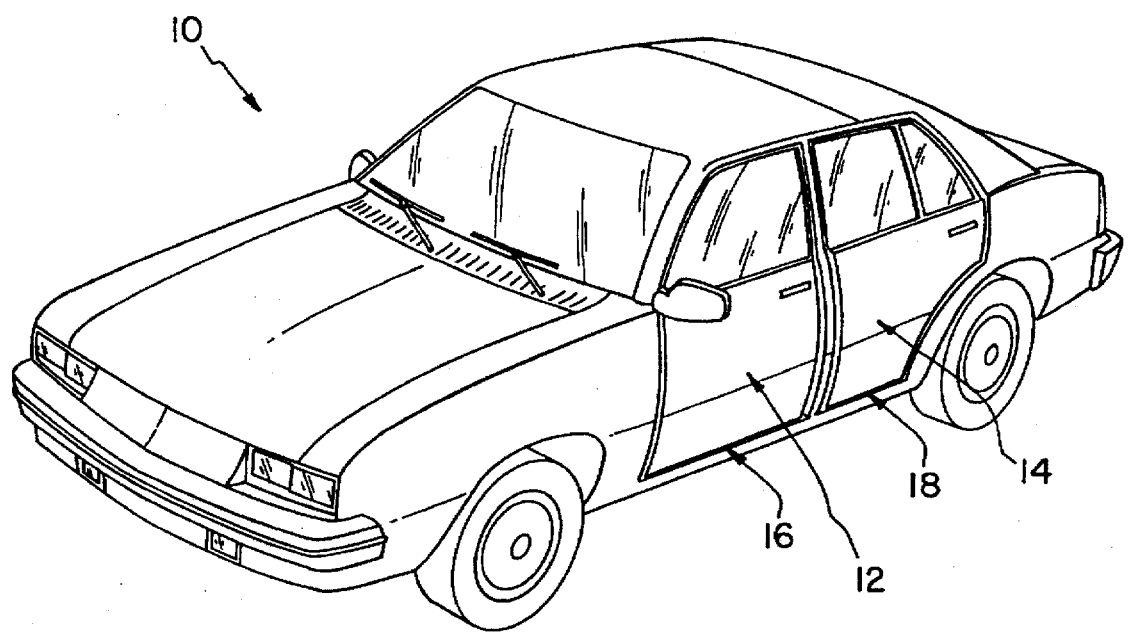
FIG. 1 illustrates an automobile of common type to schematically illustrate the location of a sill cover article according to the present invention.

FIG. 1 illustrates an automobile 10 of common type. Automobile 10 comprises a four-door vehicle having front and rear doors 12 and 14 on each side of the vehicle; and, as is usual in such vehicles, includes a plurality of sill covers which extend along the vehicle lower body starting at the front doors and extending to the rear doors in the vicinity illustrated by arrow 16 in the FIG. A four-door vehicle such as shown in FIG. 1 may also include sill covers for each of the rear doors, as well, in the vicinity illustrated by arrow 18.

The sill covers generally comprise relatively rigid or semi-rigid members which provide step pads or surfaces upon which a person may step when entering into or exiting from the vehicle. The sill covers are typically fastened to the metal body of the vehicle using push pins, screws or other suitable attachment structure.

It is also common practice to provide a vehicle such as automobile 10 with lower door seals to seal between the lower edges of the vehicle doors and the body of the vehicle when the doors are closed so as to prevent dust, wind, moisture, road noise and the like from coming up into the sill area of the vehicle. Such lower door seals typically comprise relatively, flexible members attached to the lower portions of the doors and are configured to form seals by interference when the doors are closed.

In general, the sill covers and the lower door seals comprise separately manufactured components which are individually mounted to the vehicle, each utilizing its own attachment structure.

The present invention comprises a sill cover article that includes a first, sill cover portion and a second, lower door sealing portion that is manufactured as a single component and that is adapted to be attached to a vehicle in a single mounting operation; and FIG. 2 illustrates a sill cover article according to one presently preferred embodiment of the invention. The sill cover article of FIG. 2 is generally designated by reference number 20 and includes a first, relatively rigid sill cover portion 22 and a second, relatively flexible lower door sealing portion 24. The sill cover portion includes a generally horizontal inwardly extending portion 25 and a generally vertical downwardly extending portion 26. The portion 25 is relatively flat and is preferably provided with a plurality of grooves 27 on the upper surface 28 thereof which extend along the length of the article to provide an anti-slip surface onto which a person can conveniently step when entering into or exiting from the vehicle. The portions 25 and 26 of the sill cover portion 22 are configured to extend around and cover the sill area of a vehicle (not shown in FIG. 2) as is well-known to those skilled in the art.

The lower door sealing portion 24 comprises a curved, generally downwardly extending portion which extends downwardly and outwardly from the outer edge of the horizontal portion 25 of the sill cover portion as shown in FIG. 2. The lower door sealing portion is positioned such that when the vehicle door is closed, the lower edge of the door will press against the outer surface 29 of the portion and deform the portion inwardly to provide an effective seal between the lower edge of the door and the vehicle body to prevent dust, debris, moisture, noise, etc. from entering into the sill area of the vehicle.

The sill cover article of the present invention can be attached to the vehicle in various ways. In the embodiment illustrated in FIG. 2, sill cover article 20 is attached to the vehicle by a plurality of spaced push pins 42 (only one of which is shown in FIG. 2) and adhesive tape 44. As shown in FIG. 2A, the push pins are provided with a flattened head 43 which are sized to be received and retained in an undercut groove 46 formed in the lower surface of the horizontal sill cover portion 25, and are adapted to be pressed into openings provided in the body of the vehicle to attach the sill cover article to the vehicle. The adhesive tape is affixed to the inwardly facing surface 48 of the downwardly extending sill cover portion 26 for attachment to the opposing exterior vehicle surface. The tape 44 preferably includes an adhesive on both surfaces thereof to facilitate attachment. The tape is also preferably applied to the article on an intermittent basis rather than in one continuous strip to save tape.

FIGS. 3 and 4 illustrate alternative embodiments of the invention to show other attachment structure which may be used (although the sill cover articles in FIGS. 2–4 differ somewhat in configuration as a result of their manner of attachment, they are all designated by reference no. 20 for ease in description). In FIG. 3, sill cover article 20 is attached to the sill area of the vehicle by a combination of adhesive tapes 52 and 54 and a magnet strip or bar 56. The magnet strip is supported within a groove 57 formed in the lower surface of horizontal sill cover portion 25 and adheres the article directly to the vehicle sheet metal. In FIG. 4, sill cover article 20 is also attached to the vehicle body using adhesive tapes 60 and 62 and a magnet strip 64. In addition, a magnet strip or bar 66 is inserted in a slot 68 formed in and extending the length of the lower door sealing portion 24 to assist in providing an enhanced seal with the vehicle door.

FIGS. 2–4 illustrate exemplary methods of attachment only, and it should be understood that the sill cover article of the present invention can be mounted to a vehicle in numerous other ways, as well. In general, however, it should be recognized that the sill cover article of the present invention is attached to the sill area of a vehicle as a unit in a single mounting operation.

It should also be recognized that the sill cover article of the present invention will usually be customized to the design of the sill area of the particular automobile or other vehicle with which it is to be used. Thus, the sill cover articles illustrated in FIGS. 2–4 are intended to be exemplary only of sill cover article configurations and the shapes of both the sill cover portion and the lower door sealing portion will vary significantly as a function of vehicle style.

In accordance with a presently preferred embodiment, sill cover article 20 of the present invention is composed of two or more materials of different durometer, such as, for example, two different polymeric materials. The materials may be either a thermoplastic polymer material or a thermosetting polymer material. The term "thermoset" as used herein refers to high polymers which change irreversibly upon heating and curing and are then thermally stable and the term "thermoplastic" refers to polymers which may be softened by heat and cooled in a reversible physical process. Suitable thermoset polymer materials include those materials known generally as rubbers, epoxies, urethanes, and the like. Suitable thermoplastic polymer materials include those materials known generally as vinyl polymers, thermoplastic elastomers, thermoplastic olefins, polypropylene, polyethylene, and the like.

Particularly suitable materials include vinyl compositions such as polyvinyl chloride (PVC), thermoplastic elastomers, thermoplastic olefins, polypropylene, linear low density polyethylene, and the like. Exemplary of the vinyl compositions are PVC resins having an intrinsic viscosity of approximately 1.

The two materials of different durometer are preferably coextruded simultaneously with two different extruders as well known in the art to provide a single sill cover article having portions with different properties and functions. Sill cover portion 22, for example, may comprise a semi-rigid PVC material (for example, 55 Shore D) and the lower door sealing portion 24 may comprise a relatively flexible PVC material (for example, 65 Shore A). The rigidity of the relatively stiff PVC may be flexibilized by the selective addition of a suitable plasticizer, a nonvolatile compatible liquid or solid which permits slippage of polymer chains and thus reduces the Tg and modulus of the polymer. The plasticizer content may be varied as desired depending upon the desired stiffness of the vinyl composition.

Another suitable material for the flexible lower door sealing portion is EPDM rubber, an elastomeric thermoset material formed by the polymerization of ethylene propylene and diene monomers and addition of suitable curing additives of sulfur compounds, peroxides and the like. The durometer may be adjusted by adjusting the filler level, degree of curing, the molecular weight of the elastomer used and the portion of the plasticizer used as well known in the art.

An example of a suitable vinyl composition for the semi-rigid sill cover portion according to the present invention is provided in Table 1.

TABLE 1

| Ingredient | Amount(parts/ 100 parts resin) | Preferred Amount (parts/100 parts resin) |
|---|---|---|
| Polyvinyl chloride homopolymer resin (CAS #905-86-2) | 100 | 100 |
| epoxidized soyabean oil (CAS #8013-07-8) | 5.0–15.0 | 5.0 |
| Di-isodecyl phthalate (CAS #68515-19-1) | 15.0–35.0 | 32.5 |
| calcium carbonate (CAS #1317-65-3) | 15.0–30.0 | 22.7 |
| zinc complex heat stabilizer | 1.5–3.0 | 2.0 |
| black color concentrate | 1.5–4.0 | 1.5 |

The semi-rigid sill cover portion may be formed in whole or in part of recycled vinyl material which meet certain performance specifications comparable to that of the material exemplified by Table 1. More particularly, it has been found that to form an acceptable seal the semi-rigid sill cover portion must possess the desired performance properties provided in Table 2. The performance properties referred to herein are determined in accordance with those published in the Annual Book of ASTM Standards.

TABLE 2

| | | |
|---|---|---|
| cold flex a sample around a mandrel at a specified temperature of approximately −30 deg. C. | no cracks observed | |
| tensile strength | ≧12.0 Mps | ASTM D412-92, Method A, Die C |
| tensile elongation | ≧140% | ASTM D412-92, Method A, Die C |
| specific gravity | 1.30–1.40 | ASTM D792-91 |
| durometer hardness | 55 +/− 5 Shore D | ASTM D2240-91, 15 second delay |
| mineral filler | 11%–22% | ASTM D2584-68 |
| volatile loss | ≦1% | ASTM D1203-89, Method A, 105 deg. C 3.2 mm max. sample thickness |
| color | homogeneous | |

An example of a suitable vinyl composition for the lower door sealing portion of the sill cover article according to the present invention is provided in Table 3.

TABLE 3

| Ingredient | Amount(parts/ 100 parts resin) | Preferred Amount (parts/100 parts resin) |
|---|---|---|
| Polyvinyl chloride homopolymer resin (CAS #905-86-2) | 100 | 100 |
| epoxidized soyabean oil (CAS #8013-07-8) | 5–20 | 5 |
| Di-isodecyl phthalate (CAS #68513-19-1) | 60–100 | 90 |
| calcium carbonate (CAS #1317-65-3) | 20–60 | 50 |
| zinc complex heat stabilizer | 1–3 | 1 |
| captan fungicide (CAS #133-06-02) | .6–1.5 | 0.6 |
| black color concentrate | 2–6 | 2 |

It has also been found that to form an acceptable seal the vinyl composition of the lower door sealing portion must possess the desired performance specifications provided in Table 4.

TABLE 4

| | | |
|---|---|---|
| color | homogeneous | |
| tensile strength | ≧5.0 Mpa | ASTM D412-92, Method A, Die C |
| tensile elongation | ≧300% | ASTM D412-92, Method A, Die C |
| specific gravity | 1.29–1.38 | ASTM D792-91 |
| durometer hardness | 55 +/− 5 Shore A 65 | ASTM D2240-91, 15 second delay |
| mineral filler | 18%–22% | ASTM D2584-68 |
| volatile loss | ≦3% | ASTM D1203-89, Method A, 105 deg. C 3.2 mm. maximum sample thickness |

According to the present invention, the sill cover article or a portion thereof may be provided with various coatings and/or additives as desired or required for particular applications. For example, the article may be coated or otherwise provided with a coloring agent which may be black or of another color to match or contrast with the interior or exterior color of the vehicle. The sill cover portion and the lower door sealing portion can be provided in different colors, if desired.

The sill cover article or a portion thereof can also be provided with coatings and/or additives to provide desired properties. For example, according to a presently preferred embodiment of the invention, the lower door sealing portion of the sill cover article includes an ice-release agent for preventing ice from forming thereon. The ice-release agent provides a lower door sealing portion surface having a low coefficient of friction and release properties for ice. In a preferred embodiment the ice-release agent provides a lower door sealing portion having a coefficient of friction of less than 0.25.

In particular, when the lower door sealing portion 24 is deformed by the closing of the vehicle door, it produces a trough-like configuration in the vicinity illustrated by arrow 70 in FIG. 2 that extends along the length of the sill cover article, and which has a tendency to trap water and moisture from rain, drainage, run-off, etc. Under appropriate environmental conditions in which the outside temperature is below the freezing point of water, ice can form in the trough affecting the properties of the sealing portion and produce a sticking behavior that can interfere with subsequent sealing, particularly after repeated door openings and closings.

In order to overcome this problem, according to one embodiment of the invention, a migratory additive is incorporated in the composition of the lower door sealing portion of the sill cover article which migrates to the surface of the portion shortly after extrusion. This migratory additive produces a surface layer that does not have sticking and adhesion properties for ice and thereby prevents the formation of ice that can interfere with subsequent door openings and closings that might compromise sealing without the presence of the migratory additive. The presence of the migratory additive is typically evidenced by a "bloom" or "exudation" visually seen on the surface of the sealing portion of the sill cover or may be detected physically by a change in the measured coefficient of friction of the surface of the sealing portion which contains the migratory additive as compared to a sample sealing portion without the migratory additive.

In a preferred embodiment, the migratory additive is an aliphatic amide containing a chain of at least 10 carbon atoms. It will be appreciated that it is believed that the amide group is incompatible with the vinyl compound forming the sealing portion and the long chain carbon (at least 10 carbons) promotes migration within the extrudate. Suitable migratory additives include fatty acid amide, fatty acid monoamides, and the like.

The concentration of the migratory additive in the composition is determined by the permanence of all the ingredients in the composition and may be adjusted for a minimum degree of migration to provide a sufficient amount to achieve ice-release. To practice the invention using a migratory additive a fatty acid amide (0.75 parts/100 parts resin, CAS#112-84-5) and/or a fatty acid monoamide (0.75 parts/100 parts resin, CAS#124-26-5) may be added to the composition for the lower door sealing portion of the sill cover article according to the presently preferred embodiment of the invention as provided in Table 2.

As an alternative embodiment, a thin layer of a suitable non-sticking coating material can be applied to the surface of the lower door sealing portion of the sill cover article after extrusion.

To practice the invention using an ice-release coating, it has been found that a coating composition such as a water based dispersion of polymers which forms a coating having ice release properties and a coefficient of friction of less than 0.25, sold under the name "ARC 12/1" from G.B.I.E. Inc. of Amherstburg, Canada may be used. Additional ice-release coatings include copolymerized materials of acrylate and hydroxy ethyl acrylate available under the name "B-612-127-B" or "B-612-127-A" from GenCorp. Inc., and either cured with paratoluene sulfonic acid available under the name "PTSA" from GenCorp. Inc.

The ice-release coating material is applied in a minimum coating wet thickness in a narrow band along the flexible sealing portion of the sill cover article as desired.

In practicing the invention using either the migratory additive or the ice-release coating, a minor quantity of an ultraviolet whitener or optical brightener additive may be provided so that subsequent exposure to a black or ultraviolet (UV) light source will indicate the presence of the ice-release coating or migratory additive on the surface of the flexible sealing portion. In particular, the ultraviolet additive emits under the black or UV light source according to the concentration either in the applied ice-release coating or in the migratory additive on the surface of the flexible sealing portion and thus will indicate whether the coating is present in sufficient concentration. The quantity of ultraviolet additive dispersed and dissolved in the coating is preferably the minimum amount that is reasonably detected under exposure to the black or UV light source. However, it will be appreciated that larger quantities of UV additive may also be used but larger quantities increase cost and impart a yellow color to the sealing portion.

A suitable UV additive for the compositions specified in Table 1 containing the migratory additive is provided in Table 3.

TABLE 3

| Ingredient | Amount |
|---|---|
| 2,2'(2,5-thiophenediyl)bis (5-trimethylammoxazole) (CAS #7128-64-5) | 0.005–0.05 wt % based on solids content of active ingredient |

In the alternative, when added as part of the coating the UV additive is dissolved in solution for ease of application. A suitable UV emitting solution which may be added as part of the coating is provided in Table 4.

TABLE 4

| Ingredient | Amount |
|---|---|
| 2,2'(2,5-thiophenediyl)bis (5-trimethylammoxazole) (CAS #7128-64-5) | 0.01–5.0$^1$ gram |
| toluene (CAS #108-83-3) | 100 cc |

$^1$solubility in toluene at 25 degrees celsius

Alternatively, when added as an ingredient in other coating formulations (barrier coatings, primers and the like) commonly used on flexible vinyl the UV additive similarly performs to indicate the presence of and the spread of the coating on the surface of the flexible sealing portion.

While what has been described constitutes presently preferred embodiments of the invention, it should be apparent that various modifications and changes can be made without departing from the spirit and scope of the invention. Accordingly, it should be understood that the invention is to be limited only insofar as is required by the scope of the following claims.

We claim:

1. A sill cover article for a vehicle comprising a first, relatively rigid sill cover portion for providing a sill cover function and a second, relatively flexible lower door sealing portion for providing a seal between a door of said vehicle and a body of said vehicle when the door is closed in substantially opposing relation to said vehicle body, said lower door sealing portion including an ice-release agent for preventing ice from forming on a surface thereof and an additive which emits under exposure to light according to a concentration of the ice-release agent to indicate whether the ice-release agent is present in sufficient concentration.

2. The sill cover article of claim 1, wherein said ice-release agent comprises a migratory additive incorporated in a composition of said lower door sealing portion.

3. The sill cover article of claim 1, wherein said ice-release agent comprises an ice-release coating applied to a surface of said lower door sealing portion.

4. The sill cover article of claim 1, wherein said additive which emits under exposure to light comprises an ultraviolet additive which emits under exposure to black or ultraviolet light.

5. The sill cover article of claim 1, wherein said first and second portions comprise first and second polymer materials having first and second different durometer, respectively, which are coextruded to provide a single, dual durometer component.

6. The sill cover article of claim 5, wherein said first and second polymer materials comprise first and second vinyl materials.

7. The sill cover article of claim 1, and further including attachment members for attaching said sill cover article to said vehicle.

8. The sill cover article of claim 7, wherein said attachment members include a plurality of push pins retained in a groove formed in said first, sill cover portion.

9. The sill cover article of claim 7, wherein said attachment members include an adhesive tape.

10. The sill cover article of claim 7, wherein said attachment members include a magnet strip for adhering said article to a metal portion of said vehicle.

11. A sill cover article for a vehicle, said sill cover article comprising a first, relatively rigid sill cover portion and a second, relatively flexible lower door sealing portion, said first and second portions comprising first and second polymer materials of different durometer; and additives incorporated into a composition of at least said lower door sealing portion, said additives comprising an ice-release agent incorporated into the composition of said lower door sealing portion for preventing ice from forming on a surface thereof, and an additive which emits under exposure to light according to a concentration of the ice-release agent to indicate whether the ice-release agent is present in sufficient concentration.

12. The sill cover article of claim 2, wherein said migratory additive is an aliphatic amide having a chain of at least 10 carbon atoms.

13. The sill cover article of claim 2, wherein said migratory additive is selected from the group consisting of fatty acid amides and fatty acid monoamides.

14. The sill cover article of claim 3, wherein said ice-release agent is a coating having a coefficient of friction of less than about 0.25.

15. The sill cover article of claim 11, wherein said first and second polymer materials comprise first and second vinyl materials.

16. The sill cover article of claim 11 wherein said additive which emits under exposure to light comprises an ultraviolet additive which emits under exposure to black or ultraviolet light.

* * * * *